Aug. 25, 1959     D. O. HUTCHINSON     2,900,759
SIMULATED TRUNK PLANTERS
Filed Oct. 15, 1956

INVENTOR
DAVID O. HUTCHINSON
BY William Cleland
ATTORNEY

United States Patent Office 2,900,759
Patented Aug. 25, 1959

2,900,759

SIMULATED TRUNK PLANTERS

David O. Hutchinson, St. Petersburg, Fla.

Application October 15, 1956, Serial No. 615,995

2 Claims. (Cl. 47—34)

My invention relates to planters, as for young palm plants or heads, and has for its prime object to provide a structure in simultation of the natural trunk of a mature palm of the species planted therein and thus provide a mature looking specimen for landscaping in a much shorter time than if grown to maturity in a nursery. This is particularly true of such species as *Phoenix roebelenii* palms, for example, for which a suitable head for my planter can be grown in one and a half to two years, whereas it may require as long as twenty years to produce a natural trunk for the head of 6 ft. to 8 ft. in height, such as my planter provides. Other species of palms, such as sago *Cycas revoluta*, may require even longer periods of growth in the nursery to obtain a comparable trunk for landscaping purposes.

The general purpose of my invention resides in a device of this nature which, while giving the appearance of a natural trunk for the living head planted therein, provides a hollow core or stem extending from the head container to, or below, ground level, said core being filled with soil or other suitable material, through which the roots may grow from the container to the ground. It is well known that many trees and plants, including palms, quickly grow long roots to reach a source of moisture and, therefore, will grow down the hollow core of this device to reach the ground, and thus not become root bound or stunted.

Another object of my invention is to provide a device of this nature which is light in weight and can be shipped to the location of planting before filling the base and stem with soil or the like, and assembling. The detachable container, in which the head is grown at the nursery, is the only element of the device which need be shipped with soil in place. The base is ordinarily placed below the ground level and filled with soil.

Other objects of my invention will be manifest in the following brief description and drawing which illustrates a preferred embodiment thereof, it being understood that the above general statements of the objects of my invention are intended merely to generally explain the same and not to limit it in any manner, and that modifications may be made and no limitations upon my invention are intended than are imposed by the scope of the appended claims.

Figure 1:
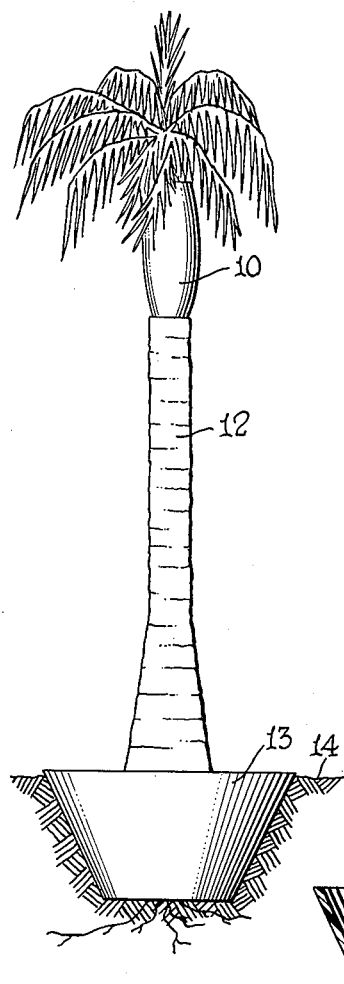
Fig. 1 is an elevation of the device showing the preferred embodiment of my invention.

Referring to the drawings generally, there is illustrated a segmental planter unit embodying the features of the invention, including a hollow, open topped container 10, as for containing a young palm plant or head 11, the container being removably supported on the upper end of an elongated core or stem 12 which simulates the trunk of a relatively mature palm tree, and also including a base 13 on which said stem is removably connected to support the same in upright position on the ground or on a suitable soil or like bed 14. Container 10 may be of bulbous shape to simulate the top portion of a palm tree trunk.

Figure 3:
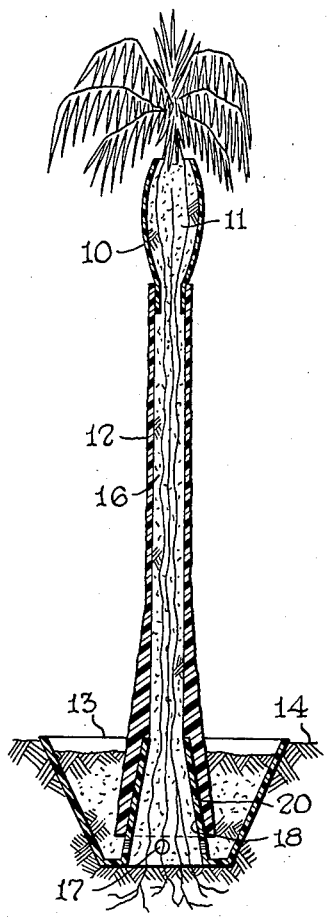
Fig. 3 is a vertical cross-section through the device of Figure 1, and showing the root growth of a palm plant or head from the container through the hollow stem to the base and into the ground.

The container 10 may be removably supported on the upper end of stem 12 by provision of a reduced neck 15, which is complementally received in the upper end of a passage 16 provided completely through the stem (see Figure 3). Base 13 is shown as a relatively large receptacle having a downwardly convergent peripheral wall 17, and having upwardly convergent a hollow core 18 integral with the bottom wall thereof. For said removable connection of the stem 12 on base 13, the lower end of the stem is shown flared at 20 for complemental seating reception on the hollow core 18. The passage 16 through stem 12 communicates at its upper end with the interior of the container, through the opening at the bottom of the container defined by the neck 15, and is also adapted to communicate with soil or the like in which the base is anchored (see Figure 3), through the hollow core 18 of the base.

Figure 2:
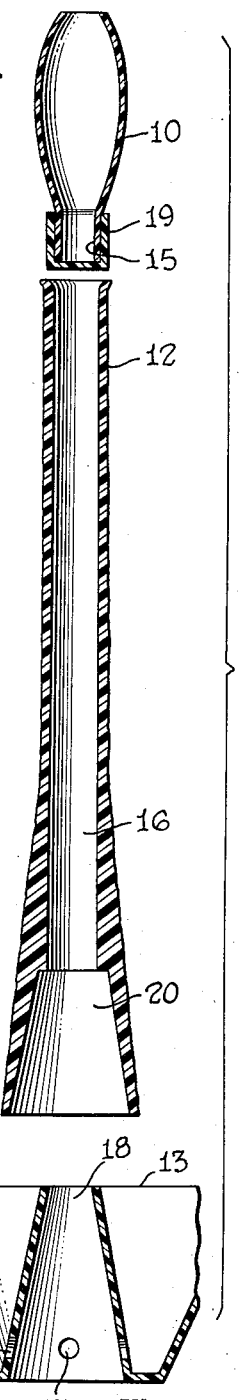
Fig. 2 is an exploded vertical section therethrough.

As previously described, the detachable container 10, with a palm plant head 11 growing in soil therein, may be cultivated in the nursery for one and a half to two years. When suitable foliage has developed on the head, the container may be shipped to location for assembly with a stem 12 and a base 13. For such shipping purposes, to retain the soil and root system in the container 10 until such assembly is accomplished, a removable cap 19 may be fitted over the reduced neck 15 of the container, as shown in Figure 2.

At the point of assembly of the container 10 with stem 12 and base 13, as best shown in Figure 3, the base may be embedded in top-soil or like growing material of the bed 14, preferably with similar material received within the base to anchor it. The stem 12 is also filled with soil-like material at the point of assembly so that the root system of the head 11 within the container may grow substantially unrestrictedly, downwardly through the stem and the base into the soil bed 14. Holes 20, near the lower portion of hollow core 18, provide for drainage of excess water from the base to the soil bed.

Component parts 10, 12, 13, and 19 may be made of plastic, fibre, or other suitable material, and designed for strength and lightness, as well as convenience in shipping, by nesting. Parts 10 and 12 are formed with their outer surfaces in simulation of the natural appearance of a live specimen of the species planted therein.

It is thought that the construction, utility, and benefits of my invention will be readily apparent to those skilled in the art without further detailed description thereof.

It will be apparent that changes in the details of construction and in the arrangement and combination of parts may be made without departing from the scope or spirit of my invention, as hereinafter claimed.

Having thus described my invention, what I claim is:

1. A planter as for landscaping purposes, comprising an upright elongated stem having a passage extending therethrough, and containing soil-like material, said stem having an anchoring enlargement of substantial horizontally outward extent at the lower end thereof adapted to be embedded in a bed of soil-like material to anchor the stem in fixed upright position with the lower end of said passage and said soil-like material therein in communication with the soil-like material of the bed, a plant container having a constricted opening in the bottom thereof and containing a plant and root system thereof growing in soil-like material, said stem and container having complementally interfitting portions by which the container constitutes a separate self-contained plant holder attached on said stem with said constricted opening communicating with the upper end of said passage and the soil-like material therein, whereby said root system of the plant is free to grow downwardly through said passage substantially unrestrictedly and into said soil-like material of said bed.

2. A planter as for landscaping purposes, comprising an upright elongated stem having a passage extending therethrough, and containing soil-like material, said stem having an achoring enlargement of substantial horizontally outward extent at the lower end thereof adapted to be embedded in a bed of soil-like material to anchor the stem in fixed upright position with the lower end of said passage and said soil-like material therein in communication with the soil-like material of the bed, a plant container having a constricted opening in the bottom thereof and containing a plant and root system thereof growing in soil-like material, said stem and container having complementally interfitting portions by which the container constitutes a separate self-contained plant holder attached on said stem with said constricted opening communicating with the upper end of said passage and the soil-like material therein, whereby said root system of the plant is free to grow downwardly through said passage substantially unrestrictedly and into said soil-like material of said bed, said plant being a relatively young palm head, and said stem and plant container having artificial means thereon combining with said head to simulate the outward appearance of a mature palm tree.

References Cited in the file of this patent

UNITED STATES PATENTS

| | | |
|---|---|---|
| 652,736 | Balsley | June 26, 1900 |
| 706,821 | Hart | Aug. 12, 1902 |
| 719,835 | Moriarty | Feb. 3, 1903 |
| 1,419,152 | Lansing | June 13, 1922 |
| 1,775,831 | Salisbury | Sept. 16, 1930 |
| 1,895,702 | Burley | Jan. 31, 1933 |

FOREIGN PATENTS

| | | |
|---|---|---|
| 226,099 | Great Britain | Dec. 18, 1924 |